April 21, 1953     Z. D. BONNER     2,635,989
CATALYTIC PROCESS AND APPARATUS

Filed Aug. 31, 1950     3 Sheets-Sheet 1

INVENTOR.
ZORA D. BONNER
BY
ATTORNEY

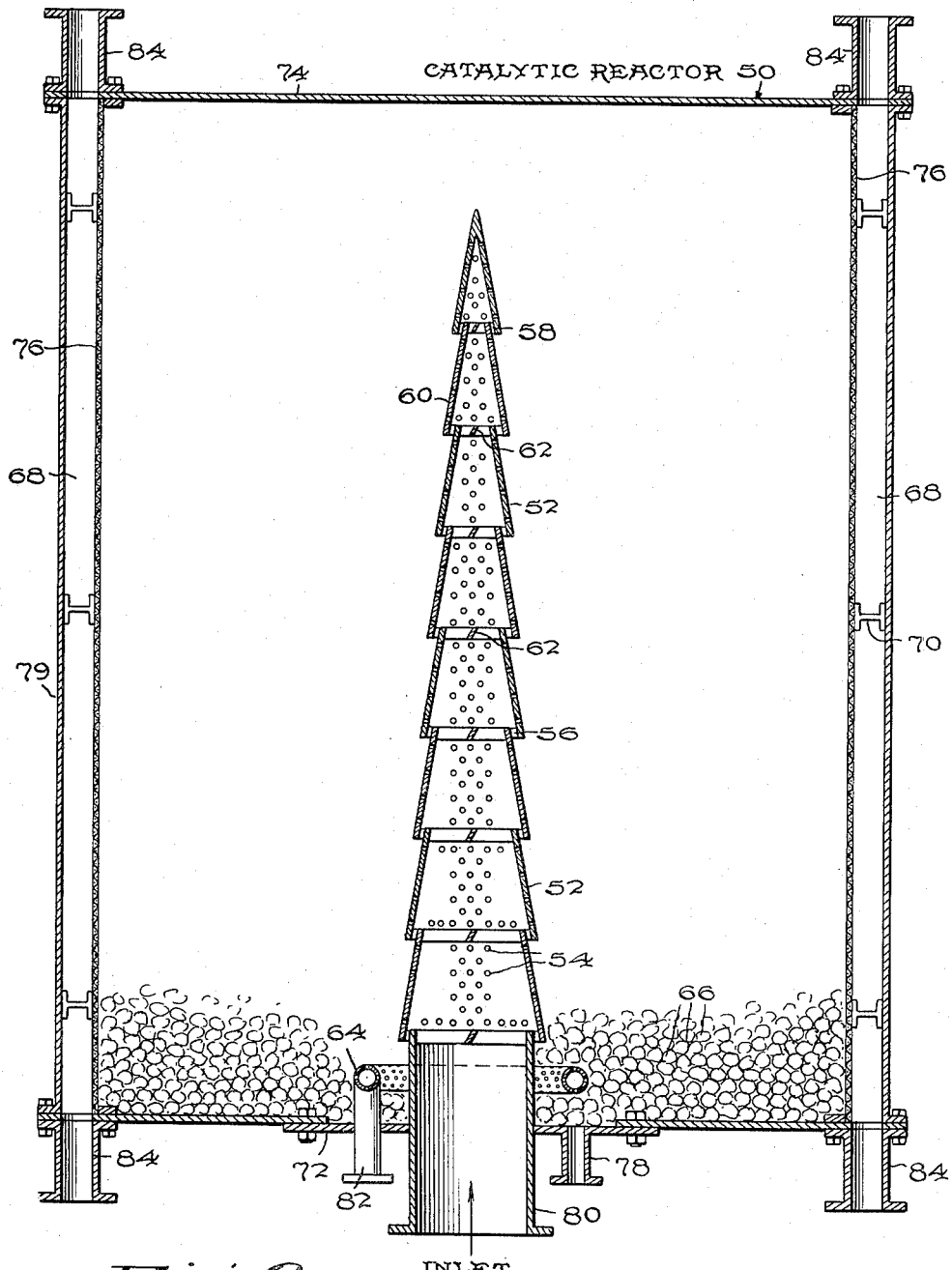

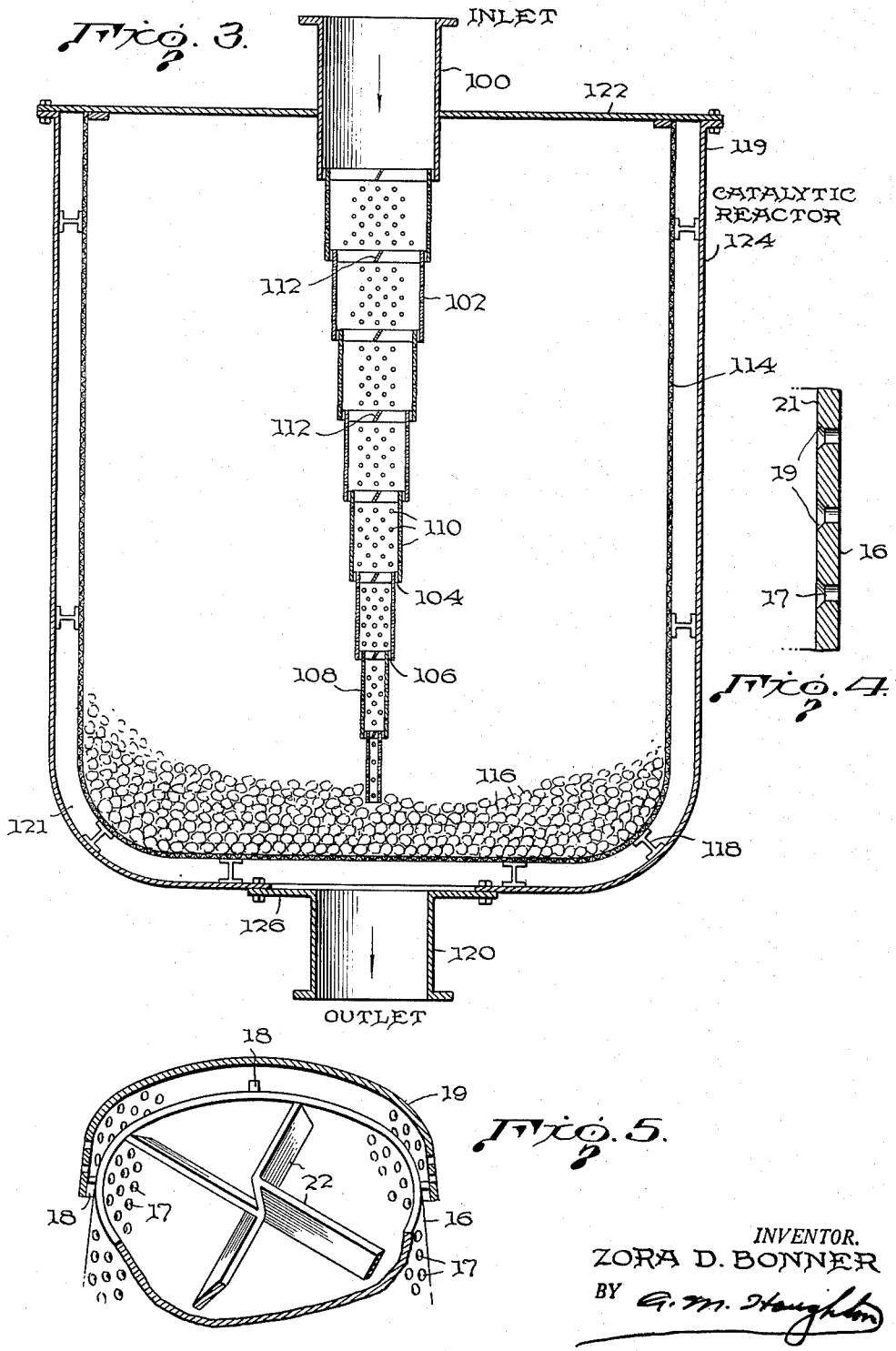

Patented Apr. 21, 1953

2,635,989

UNITED STATES PATENT OFFICE 2,635,989

CATALYTIC PROCESS AND APPARATUS

Zora D. Bonner, Port Arthur, Tex., assignor to Gulf Oil Corporation, Pittsburgh, Pa., a corporation of Pennsylvania Application August 31, 1950, Serial No. 182,587

6 Claims. (Cl. 196—53)

This invention relates to a catalytic process and apparatus and more particularly to a method and apparatus for conducting the catalytic conversion of reactants which are of the mixed liquid-vapor phase type.

Previous attempts to charge mixed liquid-vapor phase reactants to fixed or stationary catalytic beds have met with considerable difficulties; one of the principal problems encountered has been the difficulty of getting uniform distribution of liquid throughout the catalyst bed. Since in the past the reactants have generally been introduced into either the upper or lower portion of the catalyst bed through a perforated plate or grid, the result has generally been an accumulation of liquid in the catalyst bed near the entrance point of the reactants; this condition in turn has resulted in extensive coking of either the upper or lower portions of the catalyst bed. Other attempts to introduce mixed liquid-vapor phase reactants into the catalyst bed have been by means of the common perforated distribution tubes. This use, in the case of "upflow" reactors, that is, reactors in which the reactants are introduced into the base of the reactor, has often run into mechanical difficulties due to the accumulation of liquid in the distribution tubes with the consequent "slugging" of the liquid into a single portion of the catalyst bed. In the case of "downflow" reactors, that is, reactors in which the reactants are introduced into the top of the reactor, the use of a mixed liquid-vapor phase charge with the common perforated distribution tubes has often resulted in the liquid content of the charge falling to the bottom of the distribution tubes with the consequent coking of the lower portions of the catalyst bed. A still further difficulty has occurred during the regeneration period due to the large quantities of coke in localized areas of the catalyst bed as a result of the liquid phase cracking. This, in turn, has resulted in "hot spots" in the catalyst bed thus causing damage to the catalyst and often to the reactor shell.

This invention has as an object to provide a catalytic reactor in which there is a uniform distribution of liquid through a catalyst bed while charging mixed liquid-vapor phase reactants.

An additional object is to provide for the uniform distribution of the coke formed as a result of the reaction throughout the catalyst bed.

Another object is to provide an apparatus and process for treating a mixed liquid-vapor phase reactant in which predetermined amounts of liquid can be delivered to different portions of a catalyst bed.

A further object is to provide for a minimized formation of coke in the catalyst bed.

A still further object is to provide for increased conversion of a mixed liquid-vapor phase charge to desirable reaction products.

These and other objects are accomplished by this invention which embraces a catalytic reactor comprising in combination a catalyst retaining shell, means for introducing reactants into the shell, said means for introducing reactants leading into an elongated perforated reactant distribution means positioned centrally within said shell and means at spaced intervals in said distribution means for imparting rotary motion to said reactants, and means for withdrawing the reaction products from the reactor.

This invention also provides a process for conducting a catalytic reaction which comprises passing a mixed liquid-vapor phase charge into a catalyst bed along its approximate longitudinal axis, imparting rotary motion to said charge, passing the vapor and liquid through the catalyst bed, thereby effecting the catalytic reaction and withdrawing the reaction products from the reactor.

Referring to the drawings:

Figure 2 is a vertical sectional view of a catalytic reactor showing a method of withdrawing reaction products at the periphery of the catalyst bed;

Figure 3 is a vertical sectional view of a downflow catalytic reactor;

Figure 4 is a sectional view of a portion of the wall of a preferred form of a distributing member showing beveled perforations on the inner wall; and Figure 5 is a fragmentary perspective view of two conic distributing members showing in detail the construction of a means for imparting rotary motion to reactants.

Figure 1:
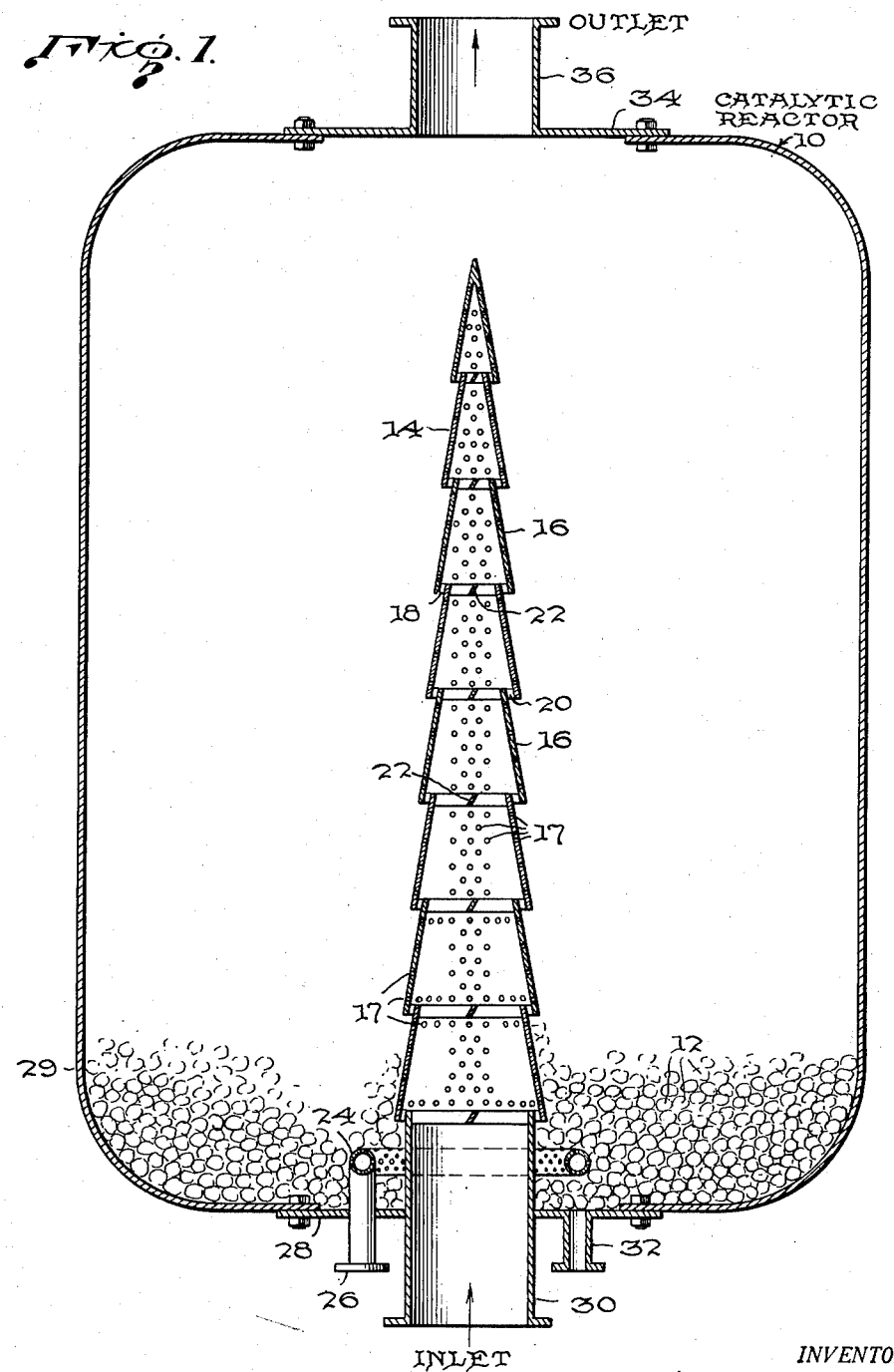
Figure 1 is a vertical sectional view of an upflow catalytic reactor in accordance with the invention.

My invention may best be described by referring to accompanying Figure 1, in which the body of catalytic reactor 10 is made up of an elongated substantially cylindrical outer shell 29 provided with heads 28 and 34 at the base and top ends respectively. The lower head 28 is provided with inlet means 30 connected to reactant distribution means 14. Preheated mixed liquid-vapor phase charge is introduced through inlet means 30 and passes into reactant distribution means 14 which is made up of a succession of upright, truncated, perforated, conic shaped members 16 which are successively smaller in average diameter from bottom to top of reactant distribution means 14. The conic shaped members 16 referred to above have perforations 17, and the edges formed by the perforations 17 and the inner walls of conic members 16 are beveled or chamfered as will be described in more detail later.

The bottom of each of the conic members 16 fits closely, and is even with or slightly overlaps, but does not touch the top of the conic member immediately below. This provides a series of annular spaces which serve as discharge ports or outlets 20. These annular spaces or discharge ports 20 are unobstructed except for structural members 18 which fasten the conic members 16 together to make up the reactant distribution means 14. The structural members 18 may take any appropriate form such as spacers or struts in case the reactant distribution means 14 is welded together, or bushings in case the reactant distribution means is bolted together. The structural members 18 serve to define and maintain the discharge ports 20. Set in the top of each conic member 16 are means for imparting rotary motion 22 which are shown as stationary four-bladed vanes.

Reactant distribution means 14 is embedded in a mass of granular or pellet type catalyst material 12 and extends a substantial distance into the catalyst mass or bed. The length of the reactant distribution means 14 in relation to the length of the catalyst mass 12 may vary depending on the type of charge stock; however, there must be a sufficient catalyst mass between the uppermost conic member and the outlet means 36 to effect conversion of that portion of the reactants which is distributed into the catalyst bed by the uppermost conic member.

Means for introducing gas such as hydrogen or a diluent gas comprising inlet 26 and perforated distribution ring 24 are placed in lower head 28. Drain means 32 is also placed in reactor lower head 28.

Referring to Figure 2 in which there is shown a second modification of my invention, the body of catalytic reactor 50 is made up of an elongated substantially cylindrical outer shell 79 with heads 72 and 74 at the base and top of the reactor respectively, and the lower head 72 in the base of the reactor is provided with inlet means 80 connected to reactant distribution means 60. Preheated mixed liquid-vapor phase charge is introduced through inlet means 80 and passes into reactant distribution means 60 which is made up of a succession of upright, truncated, perforated, conic shaped members 52 which are successively smaller in average diameter from the bottom to top of reactant distribution means 60.

The conic shaped members 52 referred to above have perforations 54 in the walls of each member and the edges formed by perforations 54 and the inner walls of the conic members 52 are beveled or chamfered as will be disclosed in more detail later. The bottom of each of the conic members 52 fits closely, and is even with or slightly overlaps, but does not touch the top of the conic member immediately below. This provides a series of annular spaces which serve as discharge ports or outlets 56.

These annular spaces or discharge ports 56 are preferably unobstructed except for structural members 58 which fasten the conic members 52 together to make up the reactant distribution means 60. The structural members 58 may take any appropriate form such as spacers or struts, in case the reactant distribution means 60 is welded together, or bushings in case the reactant distribution means 60 is bolted together. The structural members 58 serve to define and maintain the discharge ports 56. Set in the top of each of the conic members 52 are means for imparting rotary motion 62 which are shown as stationary four-bladed vanes.

Reactant distribution means 60 is embedded in a mass of granular or pellet type catalyst material 66 and extends a substantial distance into the catalyst mass or bed to a point near the top head 74.

Placed within reactor shell 79 and supported by structural members 70 is catalyst retaining member 76 which takes the form of a perforated sheet of metal or a screen. The catalyst retaining member 76 and the reactor shell 79 serve to define an annular space 68 about the periphery of the catalyst bed 66 which serves, together with members 84, as a means for withdrawing reaction products from the reactor. Means for introducing gases, such as hydrogen or a diluent gas comprising inlet 82 and perforated distribution ring 64, are placed in lower head 72. Drain means 78 is also placed in reactor lower head 72.

Referring to Figure 3, the body of catalytic reactor 124 is made up of an elongated substantially cylindrical outer shell 119 provided with heads 122 and 126 at the top and base of the reactor, respectively. The top head 122 is provided with inlet means 100 connected to reactant distribution means 108. Preheated mixed liquid-vapor phase charge is introduced through inlet means 100 and passes into reactant distribution means 108 which is made up of a succession of elongated, perforated, cylindrical members 102 which are successively smaller in average diameter from top to bottom of reactant distribution means 108.

The cylindrical members 102 referred to above, have perforations 110, and the edges formed by the perforations 110 and the inner walls of cylindrical members 102 are beveled or chamfered as will be described in more detail later.

The bottom of each of the cylindrical members 102 fits closely, and is even with or slightly overlaps but does not touch the top of the cylindrical member immediately below. This provides a series of annular spaces which serve as discharge ports or outlets 104. These annular spaces or discharge ports 104 are preferably unobstructed except for structural members 106 which fasten the cylindrical members 102 together to make up the reactant distribution means 108.

The structural members 106 may take any appropriate form such as spacers or struts in case the reactant distribution means 108 is welded together, or bushings in case the reactant distribution means 108 is bolted together. The structural members 106 serve to define and maintain discharge ports 104. Set in the top of each of the cylindrical members 102 are means for imparting rotary motion 112 which are shown as stationary four-bladed vanes.

Reactant distribution means 108 is embedded in a mass of granular or pellet type catalyst material 116 and extends a substantial distance into the catalyst mass or bed. The length of the reactant distribution means 108 in relation to the length of the catalyst mass 116 may vary depending on the type of charge stock; however, there must be a sufficient catalyst mass between the lowermost cylindrical member and outlet means 120 to effect conversion of that portion of the reactants which is distributed into the catalyst bed by the lowermost cylindrical member.

Placed within reactor shell 119 and supported by structural members 118 is catalyst retaining member 114 which takes the form of a perforated sheet of metal or a screen. Catalyst retaining member 114 and reactor shell 119 serves to define a space 121 about the periphery and bottom of catalyst bed 116 which connects to outlet means 120 through which the reaction products are withdrawn.

Referring to Figure 4, a sectional view of an enlarged portion of the wall of a perforated member is shown. The inner edges of perforations 17 in the inner walls 21 of said telescopic members are beveled or chamfered forming surfaces 19. The perforations 17 extend from surfaces 19 to outer walls 16 with a uniform diameter.

Referring to Figure 5, a fragmentary perspective view is shown of a conic member 16 with a portion of the conic member 19 immediately above. The details of structural members 18 which take the form of struts or bushings are shown. Perforations 17 and means for imparting rotary motion 22 which take the form in this instance of stationary four-bladed vanes are also shown. The pitch and/or number of the blades or vanes may be varied according to the amount of rotary motion or rotational velocity desired.

The operation of the apparatus described can be illustrated by the process of hydrocracking a total petroleum crude oil or a reduced crude in the apparatus shown in Figure 1. The charge stock together with hydrogen in amounts of from 1,000 to 20,000 s. c. f./bbl. is preheated to reaction temperature which is in the order of 650 to 1000° F. under a pressure of from atmospheric of 1000 p. s. i. g. and beyond. Under these conditions, the charge stock will take the form of a mixed liquid-vapor phase material, the proportion of liquid or vapor phase depending on the nature of the charge stock and the temperature and pressure. The liquid phase is usually distributed in the vapor phase in the form of a mist or as droplets. This mixed liquid-vapor phase charge is introduced into reactant distribution means 14 within catalyst mass 12 and catalytic reactor 10 by means of inlet 30. The mixed liquid-vapor phase reactant or charge passes upwardly in reactant distribution means 14 and contacts means for imparting rotary or spinning motion 22 which are shown as stationary four-bladed vanes in this instance.

Due to the fact that the liquid particles in the mixed liquid-vapor phase charge have a greater density than the vapor, the rotary motion results in throwing the liquid phase against the inner walls of conic members 16; and a portion of the liquid phase, after contacting and being collected on the inner walls of each conic member, is aspirated through the perforations 17 in the walls of the conic members 16 by the vapor phase portion of the charge into catalyst bed 12. The beveled edges of the perforations 17 (shown in detail in Figure 4) tend to prevent the downward flowing liquid from flowing around the perforations and thus failing to be aspirated into the catalyst bed at this point. The remaining portion of the liquid phase continues to flow downwardly along the inner walls of the conic members, and together with additional vapor, passes out of discharge ports 20 at which time it is immediately contacted by the vapor and liquid passing out of the perforations of the conic member immediately below with the result that all of the liquid portion is dispersed uniformly throughout catalyst bed 12.

The liquid phase tends to flow or trickle downwardly through catalyst bed 12; however, this tendency is opposed by the upward motion of the vapors and reaction products moving toward outlet 36 in the top of reactor 10. This retention of liquid in the catalyst bed allows increased opportunity for catalytic conversion of the liquid portion of the mixed liquid-vapor phase reactants. The reaction products are withdrawn through outlet 36 in the top of reactor 10.

When reactants are charged containing a high percentage of liquid phase, or reactants are charged which contain a difficultly convertible liquid phase, it may not be possible to convert all of the liquid phase into desirable reaction products; and thus part of the liquid phase may continue to pass downwardly through the catalyst bed and collect in the lower part of the reactor. To remove the collected liquid from the lower part of the reactor, and thus avoid coking in this section of the reactor, drain means 32 has been placed in reactor base 28.

Under some conditions it may be desirable to introduce a hydrogen containing gas or a diluent gas directly into the lower portion of the catalyst bed 12. For this purpose, means for introducing gas comprising inlet 26 and perforated distribution ring 24 has been provided.

The catalyst bed 12 mentioned may be any conventional hydrocracking catalyst such as oxides and/or sulfides of group VI or group VIII or mixtures of groups VI and VIII deposited on a silica-alumina or alumina carrier.

Regeneration of the catalyst bed 12 is preferably accomplished by passing regeneration gases through inlet means 30 and reactant distribution means 14 into catalyst bed 12. The gases are withdrawn through outlet 35. Although the preferred procedure for regeneration has been described above, it is possible to regenerate by passing regeneration gases into the reactor 10 through member 36 and withdrawing said gas through reactant distribution means 14 and member 30.

The operation of the apparatus shown in Figure 2 can also be illustrated by the process of hydrocracking a total petroleum crude oil or a reduced crude. The charge stock together with hydrogen in amounts of from 1,000 to 20,000 s. c. f./bbl. is preheated to reaction temperature which is in the order of 650 to 1000° F. under a pressure of from atmospheric to 1000 p. s. i. g. and beyond. Under these conditions the charge stock will take the form of a mixed liquid-vapor phase material, the proportion of liquid or vapor phase depending on the nature of the charge stock and the temperature and pressure. The liquid phase is usually distributed in the vapor phase in the form of a mist or as droplets. This mixed liquid-vapor phase charge is introduced into the reactant distribution means 60 within catalyst mass 66 and catalytic reactor 50 by means of inlet 80. The mixed liquid-vapor phase reactant or charge passes upwardly in reactant distribution means 60 and contacts means for imparting rotary or spinning motion 62 which are shown as stationary four-bladed vanes in this instance.

Due to the fact that the liquid particles in the mixed liquid-vapor phase charge have a greater density than the vapor, the rotary motion results in throwing the liquid phase against the inner walls of conic members 52; and a portion of the liquid phase, after contacting and being collected on the inner walls of each conic member is aspirated through the perforations 54 in the walls of the conic members 52 by the vapor phase portion of the charge into catalyst bed 66. The beveled edges of the perforations 54 (shown in detail in Figure 4) tend to prevent the downward flowing liquid from flowing around the perforations and thus failing to be aspirated into the catalyst bed at this point. The remaining portion of the liquid phase continues to flow downwardly along the inner walls of the conic members, and together with additional vapor, passes out of discharge ports 56 at which time it is immediately contracted by the vapor and liquid passing out of the perforations of the conic member immediately below with the result that all of the liquid portion is dispersed uniformly throughout catalyst bed 66.

The liquid phase tends to flow or trickle downwardly through catalyst bed 66; however, the outward or radial flow of the vapors and reaction products moving radially from reactant distribution means 60 toward catalyst retaining member 76, has a tendency to carry the liquid phase through catalyst bed 66 towards the periphery of the catalyst bed. This allows opportunity for conversion of the liquid portion of the mixed liquid-vapor phase reactants. The reaction products pass through catalyst retaining member 76 into the annular space 68 formed by catalyst retaining member 76 and reactor shell 79 and are withdrawn through outlets 84.

When reactants are charged containing a high percentage of liquid phase, or the liquid phase portion of the reactants is difficultly convertible, it may not be possible to convert all of the liquid phase into desirable reaction products; and thus part of the liquid phase may continue to pass downwardly through the catalyst bed and collect in the lower part of the reactor. To remove the collected liquid from the lower part of the reactor, and thus avoid coking in this section of the reactor, drain means 78 has been placed in reactor base 72.

Under some conditions it may be desirable to introduce a hydrogen containing gas or a diluent gas directly into the lower portion of catalyst bed 66. For this purpose, means for introducing gas comprising inlet 82 and perforated distribution ring 64 has been provided.

The catalyst bed 66 is the same as described for the operation of the apparatus of Figure 1.

Regeneration of the catalyst bed 66 is preferably accomplished by passing regeneration gases through means 84 into the annular space 68, through catalyst retaining member 76, and withdrawing said gases through reactant distribution means 60. Although the preferred regeneration procedure has been described above, regeneration may be accomplished by passing the regeneration gases into catalyst bed 66 by way of reactant distribution means 60 and withdrawing the regeneration gases through catalyst retaining member 76, annular space 68 and outlets 84.

The operation of the apparatus shown in Figure 3 may also be illustrated by the process of hydrocracking a total petroleum crude oil or a reduced crude. The charge stock, together with hydrogen in amounts of from 1,000 to 20,000 s. c. f./bbl., is preheated to reaction temperature which is in the order of 650 to 1000° F. under a pressure of from atmospheric to 1000 p. s. i. g. and beyond. Under these conditions, the charge stock will take the form of a mixed liquid-vapor phase material, the proportion of liquid or vapor phase depending on the nature of the charge stock and the temperature and pressure. The liquid phase is usually distributed in the vapor phase in the form of a mist or as droplets. This mixed liquid-vapor phase charge is introduced into reactant distribution means 108 within catalyst mass 116 and catalytic reactor 124 by means of inlet 100. The mixed liquid-vapor phase reactant or charge passes downwardly in reactant distribution means 108 and contacts means for imparting rotary or spinning motion 112 which are shown as stationary four-bladed vanes in this instance.

Due to the fact that the liquid particles in the mixed liquid-vapor phase charge have a greater density than the vapor, the rotary motion results in throwing the liquid phase against the inner walls of cylindrical members 102; and a portion of the liquid phase, after contacting and being collected on the inner walls of each of the cylindrical members, is aspirated through the perforations 110 in the walls of the cylindrical members 102 by the vapor phase portion of the charge into catalyst bed 116. The beveled edges of the perforations 110 (shown in more detail in Figure 4) tend to prevent the downward flowing liquid from flowing around the perforations and thus failing to be aspirated into the catalyst bed at this point. The remaining portion of the liquid continues to flow downwardly along the inner walls of the cylindrical members, and together with additional vapor, passes out of discharge ports 104 at which time it is immediately contacted by the vapor and liquid passing out of the perforations of the cylindrical member immediately below with the result that all of the liquid portion is dispersed uniformly throughout catalyst bed 116.

The liquid phase tends to flow or trickle downwardly through catalyst bed 116; however, since a portion of the vapors and reaction products flow outwardly perpendicular to the axis of reactant distribution means 108, a portion of the liquid phase is carried radially toward the vertical section of catalyst retaining member 114. The remaining portion of the liquid phase flows downwardly in the bed along with a portion of the vapors and reaction products to the horizontal portion of catalyst retaining member 114.

The reaction products and unconverted liquid are withdrawn through catalyst retaining member 114, space 121 and outlet 120.

The catalyst bed 116 is the same as described for the operation of the apparatus of Figure 1.

Regeneration of catalyst bed 116 is preferably accomplished by passing regeneration gases through means 120 into space 121, formed by reactor shell 119 and catalyst retaining member 114, through catalyst retaining member 114 and withdrawing the gases through reactant distribution means 108. Although the preferred method of regeneration has been described above, regeneration may be accomplished by introducing regeneration gases into reactant distribution means 108 and withdrawing said gases through catalyst retaining member 114, space 121 and means 120.

A desirable modification in the operation of the reactors shown in Figures 1, 2 and 3 is the use of blades or vanes comprising the means for imparting rotary motion of progressively increasing pitch from the inlet end of the reactant distribution means along its length with the lowest pitch at the inlet end. This provides a means for imparting a low rotary motion or rotational velocity to the reactants as they enter the reactant distribution means and increases the rotary motion or rotational velocity as the reactants pass along the length of the reactant distribution means. The use of a low rotational velocity at or near the inlet prevents the distribution of an excess of liquid from the high liquid content charge into the section of the catalyst bed nearest the reactor inlet. This same effect may also be achieved by using a progressively increasing number of blades or vanes comprising the means for imparting rotational velocity from the inlet end of the reactant distribution means along its length or by increasing both the pitch and the number of blades or vanes progressively along the length of the reactant distribution means. It is further within the scope of my invention to vary the pitch and/or the number of blades or vanes comprising the means for imparting rotary motion along the length of the reactant distribution means to permit a non-uniform distribution of liquid into the catalyst bed so as to result in a predetermined pattern of liquid distribution in the catalyst bed.

The use of the apparatus of Figure 1 is desirable where there are large quantities of liquid phase present in the charge stock to be converted as the "upflow" type reactor shown in Figure 1 gives greater opportunity for conversion of the liquid portion than does the apparatus shown in Figures 2 and 3. However, the apparatus shown in Figures 2 and 3 may be used with complete satisfaction for charges which do not contain abnormal quantities of liquid phase or difficultly convertible liquid phase.

All of the apparatus shown are so designed as to accommodate the large volumes of regeneration gases which must be passed through the catalyst bed with a minimum pressure drop when regeneration is conducted in the preferred manner. The apparatus shown in Figures 2 and 3 have the further advantage that when regenerating gases are introduced into the space formed by the catalyst retaining member (76 in Figure 2, 114 in Figure 3) and the reactor shell (79 in Figure 2, 119 in Figure 3), and withdrawn through the reactant distribution means (60 in Figure 2, 108 in Figure 3); the cool gases flow adjacent the reactor shell and the hottest gases withdrawn from the center of the catalyst bed. This has the advantage of eliminating damage to the reactor shell due to overheating.

While my invention has been described in some detail, it will be noted that there are a number of equivalents which may be used. The means for imparting rotary motion have been described "vanes"; however, other stationary mechanism such as a propeller shaped mechanism may be used. While the drawings indicate reactant distribution members comprising eight conic members in Figures 1 and 2 and eight cylindrical members in Figure 3, the number of these members is not critical and may be varied with the length of the reactor or any pecularities of the charge stock. The reactant distribution means has been described as being made up of conic members or cylindrical members, but it is not necessary that the reactant distribution means be made up of conic members or cylindrical members or even separate segments to fall within the scope of my invention.

The process example described deals with the use of the disclosed apparatus in connection with hydrocracking, but the apparatus disclosed may be used to conduct any catalytic reaction in which one of the reactants or materials to be converted is partly in liquid phase, such as catalytic hydrogenation of liquid coal extracts, catalytic hydrogenation or aromatic compounds such as the conversion of benzene to cyclohexane, catalytic oxidation of acetaldehyde to acetic acid, catalytic chlorination by the direct action of chlorine gas and other reactions.

Although it is not shown in the accompanying drawing, it is within the scope of the modification of this invention shown in Figure 1 to use a plurality of reactant distribution members, each being similar to the single reactant distribution members indicated in the drawings.

In Figures 2 and 3 the space formed by the catalyst retaining member and the reactor shell may be replaced by other mechanism such as perforated tubing or "fingers" extended up the inner side of the reactor walls.

It is also within the scope of my invention to replace the downflow reactor shown in Figure 3 with an upflow reactor in which the reactant distribution means comprising a plurality of perforated cylindrical members is inverted and the reactants are admitted into the base of the reactor and the reaction products withdrawn from the top of the reactor.

The invention described herein has the advantage of offering a positive means for distributing the liquid portion of a mixed liquid-vapor phase charge throughout a catalyst bed thus allowing the liquid to be more fully converted to desirable reaction products. A further desirable advantage of this invention is the prevention of the accumulation of coke in localized areas of the catalyst bed with the elimination of the resulting "hot spots" during regeneration and the consequent elimination of stresses and damage to the reactor and catalyst due to overheating.

During regeneration with the apparatus shown, the construction of the apparatus makes possible the handling of large quantities of regeneration gases without an excessive pressure drop across the catalyst bed. In the modifications shown in Figures 2 and 3 the coolest portion of the regeneration gases are introduced into the catalyst bed adjacent the reactor shell and the hottest portion is withdrawn from the center of the catalyst bed. Since the outlet temperature of the regeneration gases is often above 1200° F., damage occasionally occurs to the metal parts of the reactor coming in contact with the high temperature gases, and in the modifications shown in Figures 2 and 3 such damage would be confined to the reactant distribution means which can be relatively easily replaced at comparatively small expense.

The above description deals with the specific construction of the preferred modifications of the invention which have been found to satisfy all of the stated objects, but it will be understood that any changes or modifications in this design may be made by those skilled in the art without departing from the spirit of the invention as defined in the appended claims.

What I claim is:

1. Catalytic apparatus for contacting a liquid-vapor mixture with a stationary bed of catalyst comprising in combination a catalyst retaining shell adapted to hold and retain a stationary bed of catalyst, an elongated hollow perforated reactant distributor positioned centrally within the shell, means for introducing liquid-vapor reactant into the perforated reactant distributor, means for imparting rotary motion to the liquid-vapor reactant as it passes through the perforated reactant distributor said means comprising a plurality of sets of stationary surfaces positioned at spaced intervals in the perforated distributor each of the surfaces in each set being at an angle to the direction of flow of the liquid-vapor reactant and cooperating to impart rotary motion to the liquid-vapor reactant and means for withdrawing reaction products from the catalyst retaining shell.

2. Catalytic apparatus for contacting a liquid-vapor mixture with a stationary bed of catalyst comprising in combination a catalyst retaining shell adapted to hold and retain a stationary bed of catalyst, an elongated hollow perforated reactant distributor positioned centrally within the shell, said distributor comprising a plurality of superimposed, perforated truncated cones progressively decreasing in diameter as the top of the distributor is approached and being spaced from each other so as to form an annular space therebetween, means for introducing liquid-vapor reactant into the base of the perforated reactant distributor, means for imparting rotary motion to the liquid-vapor reactant as it passes through the perforated reactant distributor said means comprising a plurality of sets of stationary surfaces positioned at spaced intervals in the perforated distributor each of the surfaces in each set being at an angle to the direction of flow of the liquid-vapor reactant and cooperating to impart rotary motion to the liquid-vapor reactant and means for withdrawing reaction products from the catalyst retaining shell.

3. Catalytic apparatus for contacting a liquid-vapor mixture with a stationary bed of catalyst comprising in combination a catalyst retaining shell adapted to hold and retain a stationary bed of catalyst, an elongated hollow perforated reactant distributor positioned centrally within the shell, said distributor comprising a plurality of perforated, superimposed cylinders progressively decreasing in diameter as the lower part of the distributor is approached, means for introducing liquid-vapor reactant into the top of the perforated reactant distributor, means for imparting rotary motion to the liquid-vapor reactant as it passes through the perforated reactant distributor said means comprising a plurality of sets of stationary surfaces positioned at spaced intervals in the perforated distributor each of the surfaces in each set being at an angle to the direction of flow of the liquid-vapor reactant and cooperating to impart rotary motion to the liquid-vapor reactant and means for withdrawing reaction products from the catalyst retaining shell.

4. A process for contacting a liquid-vapor mixture with a catalyst, which process comprises passing a stream of liquid-vapor mixture through an elongated distributing zone located in the central portion of the catalyst bed, impinging the stream of liquid-vapor mixture as it flows along the distributing zone against stationary surfaces which surfaces are set at an angle to the direction of flow of the liquid-vapor mixture, whereby rotary motion is imparted to the liquid-vapor mixture as it flows through the distributing zone and whereby the liquid in the liquid-vapor mixture is separated from the vapor before the liquid contacts the catalytic surface, introducing the so-separated liquid into the catalyst bed, passing the vapor portion of the liquid-vapor charge through the catalyst bed and withdrawing reaction products from the catalyst bed.

5. A process for contacting a liquid-vapor mixture with a catalyst, which process comprises passing a stream of liquid-vapor mixture through an elongated distributing zone located in the central portion of the catalyst bed, impinging the stream of liquid-vapor mixture as it flows along the distributing zone against stationary surfaces positioned at spaced intervals in the distributing zone and set at an angle to the direction of flow of the liquid-vapor mixture whereby rotary motion is imparted to the liquid-vapor mixture as it flows through the distributing zone and whereby the liquid in the liquid-vapor mixture is separated from the vapor into approximately equal portions at the spaced intervals before the liquid contacts the catalytic surface, introducing the so-separated liquid portions into different sections of the catalyst bed, passing the vapor portion of the liquid-vapor charge through the catalyst bed and withdrawing reaction products from the catalyst bed.

6. A process of hydrocracking a hydrocarbon by contacting liquid-vapor mixture of a hydrocarbon with hydrogen and a catalyst, which process comprises passing a stream of mixed hydrocarbon liquid and vapor together with hydrogen through an elongated distributing zone located in the central portion of the catalyst bed, impinging the stream of liquid-vapor mixture as it flows along the distributing zone against stationary surfaces, which surfaces are set at an angle to the direction of flow of the liquid-vapor mixture whereby rotary motion is imparted to the liquid-vapor mixture as it flows through the distributing zone and whereby the liquid in the liquid-vapor mixture is separated from the vapor before the liquid contacts the catalytic surface, aspirating the so-separated liquid into the catalyst bed by passing the vapor portion of the liquid-vapor charge closely adjacent the separated liquid and thence into the catalyst bed and withdrawing reaction products from the catalyst bed.

ZORA D. BONNER.

References Cited in the file of this patent

UNITED STATES PATENTS

| Number | Name | Date |
|---|---|---|
| 456,742 | Smidth | July 28, 1891 |
| 714,843 | Wentz | Dec. 2, 1902 |
| 767,335 | Evers | Aug. 9, 1904 |
| 1,496,094 | Moetheli | June 3, 1924 |
| 1,558,119 | Sherban | Oct. 20, 1925 |
| 1,934,093 | Russell | Nov. 7, 1933 |
| 2,079,934 | Fitch et al. | May 1, 1937 |
| 2,305,796 | Seidel | Dec. 22, 1942 |
| 2,315,208 | Kinnaird | Mar. 30, 1943 |

FOREIGN PATENTS

| Number | Country | Date |
|---|---|---|
| 12,863 | Great Britain | Aug. 4, 1889 |